UNITED STATES PATENT OFFICE.

CHARLES T. BASTAND, OF LONDON, ENGLAND.

MANUFACTURE OF PRINTING-INK.

SPECIFICATION forming part of Letters Patent No. 247,597, dated September 27, 1881.

Application filed July 5, 1881. (No specimens.) Patented in England May 13, 1881.

*To all whom it may concern:*

Be it known that I, CHARLES TALMAGE BASTAND, of London, England, have invented new and useful Improvements in the Manufacture of Printing-Ink, (for which I have obtained provisional protection in Great Britain, dated May 13, 1881, No. 2,103,) of which the following is a specification.

My invention relates to improvements in the manufacture of printing-ink; and it consists chiefly in the utilization, in such manufacture, of the oily and greasy product, mixture, or compound hereinafter described. This compound may be extracted from engineers' cotton-waste, in the manner and by the apparatus described in the specification of my application for a patent filed the 7th day of June, A. D. 1881, and subsequently secured to me by Letters Patent of the United States, dated August 16, 1881, and numbered 245,765. According to the process described in said patent, the greasy matters are extracted from cotton-waste by first passing bisulphide of carbon up through the waste, then heating it until the grease has softened, then drawing off the bisulphide of carbon and dissolved greasy matter to a still, and then repeating the above steps until all the greasy matter is extracted, and finally distilling the bisulphide of carbon from the greasy matter and any remaining traces of the waste. The oil or grease then left in the vessel is drawn off, and constitutes the compound hereinafter described. This product or extract is of a viscous nature, and contains lubricating oil and grease, lamp-oil, and lamp-black, also a large quantity of iron in a very finely-divided condition, and is highly advantageous for the purpose of my invention, for the reason that the iron and lamp-black contained therein impart to it a very dark or approximately black color, thereby necessitating the admixture with the said product of but very little additional coloring-matter to render it fit for use as printing-ink.

In carrying my invention into practice I take any required quantity of the said product or compound and mix therewith some or all of the following ingredients—that is to say, lamp-black, or ivory, or other suitable black, resin, or resin-oil, soap, and indigo, or other suitable blue pigment or color. Taking six pounds, for instance, of the said product or compound, containing about seven per cent. of iron, I find that the addition thereto of the aforesaid ingredients in the following proportions is highly advantageous for the purpose of my invention—that is to say, eight and a half ounces of lamp or other black, six and a half ounces of resin, one ounce of yellow or other soap, and two and a half ounces of indigo, prussian, or other blue. The proportions of these ingredients are varied according to the amount of coloring-matter contained in the product as extracted from the waste. The addition of very small quantities of these substances or ingredients will, however, in most cases be found adequate for the purpose of my invention.

By the employment of the product above described, and the addition thereto of the aforesaid ingredients, I am enabled to produce a printing-ink at a cost much less than that of ordinary printing-ink, while at the same time it has various properties which render its use preferable to that of such ordinary ink.

Although I have in the above description more particularly referred to the said compound as a product obtained from engineers' cotton-waste, I do not confine myself to the use of such a product, as any oily or greasy fluid or compound containing ferruginous or coloring material in a very finely-divided condition— such as the spent oil from machinery journals or bearings, and the like—may be employed without departing from the principle of my invention. Moreover, I may in some cases mix with oil a suitable quantity of iron, preferably in the form of oxide, prior to the admixture with such oil of the other ingredients necessary to fit it for use as a printing-ink. I prefer, however, in all cases to use the product obtained from engineers' cotton-waste, by reason of its comparatively slight cost and the presence of the above-described various constituents or properties, which, so far as I am aware, are not to be found in any other product or compound.

What I claim is—

As a new article of manufacture, printing-ink composed of the herein-described product obtained from engineers' cotton-waste, added to lamp or other black, resinous material, soap, and indigo, or other like pigment, in about the proportions set forth.

CHARLES TALMAGE BASTAND.

Witnesses:
 LEWIS SANDERSON,
 P. DEVIN.